United States Patent Office 2,697,726
Patented Dec. 21, 1954

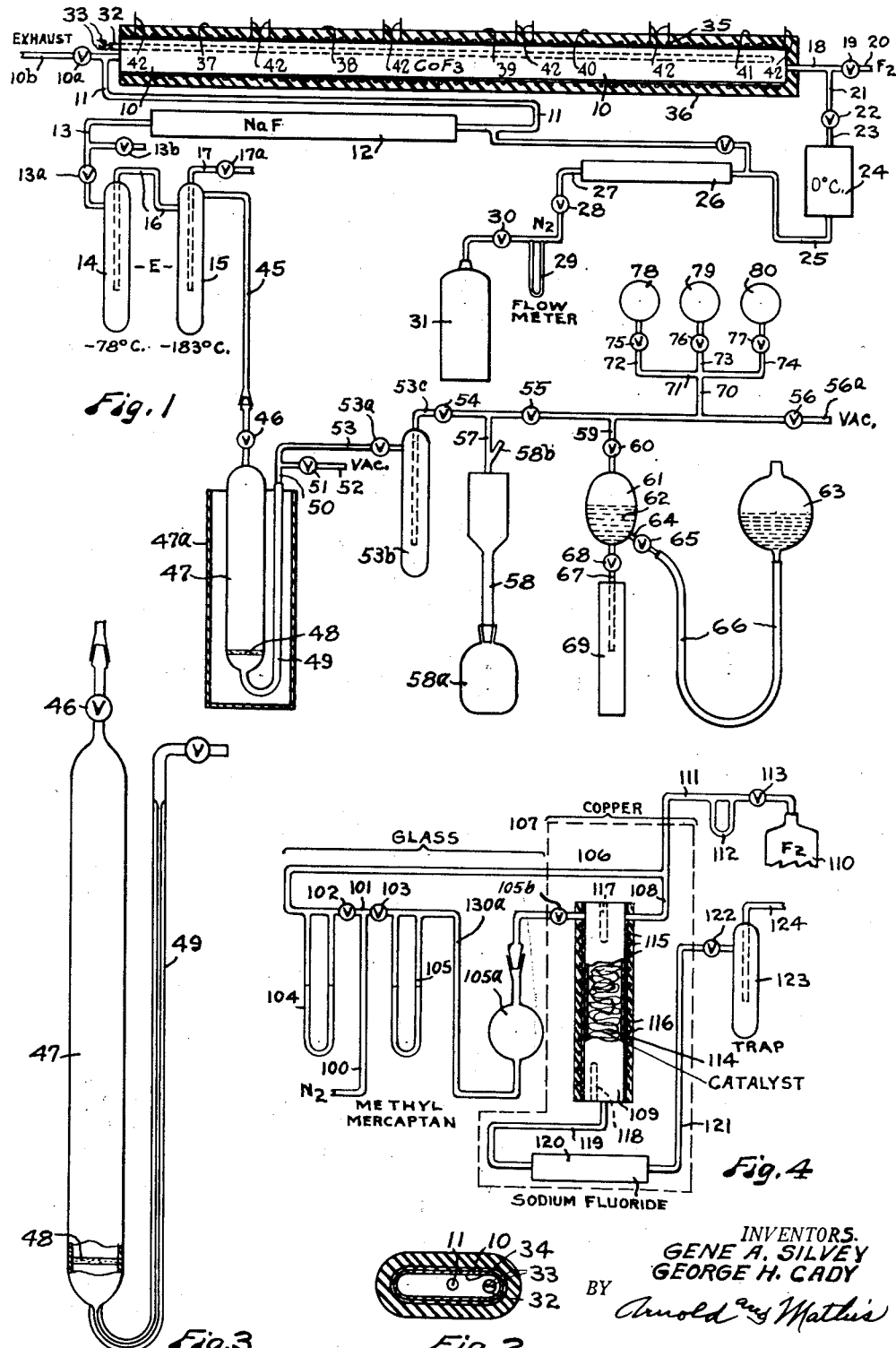
Dec. 21, 1954   G. A. SILVEY ET AL   2,697,726
TRIFLUOROMETHYLSULFUR PENTAFLUORIDE
AND METHOD OF PREPARING THE SAME
Filed May 29, 1951   2 Sheets-Sheet 1
INVENTORS.
GENE A. SILVEY
GEORGE H. CADY
BY
Arnold and Mathis
ATTORNEYS.

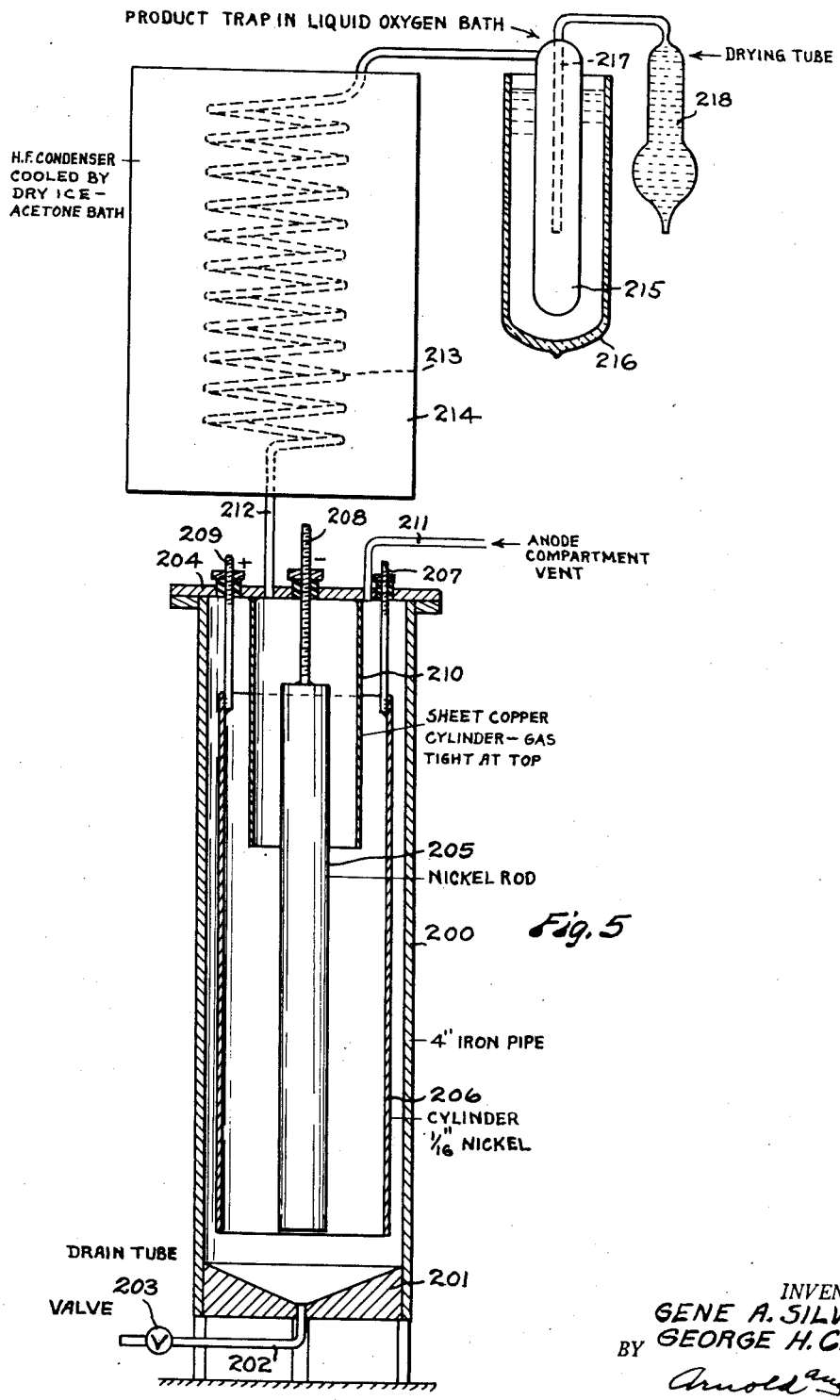

2,697,726

TRIFLUOROMETHYLSULFUR PENTAFLUORIDE AND METHOD OF PREPARING THE SAME

Gene A. Silvey, New York, N. Y., and George H. Cady, Seattle, Wash.

Application May 29, 1951, Serial No. 228,846

13 Claims. (Cl. 260—543)

Our invention relates to the compound trifluoromethylsulfur pentafluoride ($CSF_8$), and to methods by which it may be prepared.

The compound of our invention is characterized by its highly inert chemical property. It is superior to sulfur hexafluoride ($SF_6$) as an electrical insulator. Although sulfur hexafluoride has been known for many years, substituted derivatives of this compound have not been known. The present invention relates to the first known derivative of this type so far as applicants are aware.

The compound of our invention, trifluoromethylsulfur pentafluoride, is a colorless gas. As one example, its chemically inert character is illustrated by the fact that it reacts even with metallic sodium only when the metal is heated.

Among the uses for the compound of our invention are the following:

(a) As an electrical insulating gas for use with high voltage apparatus, such as generators, motors, or generator commutators, etc.;

(b) As a refrigerant—the compound would be of value because of its boiling point and its chemical inertness;

(c) As an inert gaseous atmosphere of high gas density; and (d) As a starting material for the production of sulfur tetrafluoride, a compound which has been heretofore very difficult to prepare with any degree of purity.

Among the difficulties involved in the preparation of the compound of the invention are the following:

The outstanding difficulty is the handling of corrosive chemicals, that is, chemicals hydrogen fluoride (HF) or fluorine ($F_2$), are very reactive and will attack many materials which might otherwise be employed for the construction of the equipment for the preparation of the product.

Another major difficulty is the separation of the product or compound of the invention from the various by-products formed simultaneously therewith.

The present invention involves the discovery of the compound, trifluoromethylsulfur pentafluoride. Also the present invention involves the discovery that such compound may be prepared by the processes herein set forth.

The above-mentioned general objects of our invention, together with others inherent in the same, are attained by the processes which may be carried out in the apparatus illustrated in the following drawings, throughout which drawings like reference numerals indicate like parts:

Figure 1 shows the arrangement of the apparatus in schematic form employed for the synthesis of trifluoromethylsulfur pentafluoride;

Fig. 2 represents a cross-sectional view of the reaction vessel;

Fig. 3 is an enlarged longitudinal sectional view of the low temperature filter;

Fig. 4 represents in schematic form the apparatus employed in the catalytic method of producing trifluoromethylsulfur pentafluoride; and Fig. 5 is a longitudinal sectional view of the apparatus for effecting the electrolytic production of trifluoromethylsulfur pentafluoride.

Our invention and discovery involves the preparation of the compound by any of the following methods:

First: The action of cobalt trifluoride on methyl mercaptan vapor;

Second: The action of cobalt trifluoride on carbon disulfide;

Third: The fluorination of methyl mercaptan vapor by fluorine in the presence of a catalyst; and Fourth: By the electrolysis of a solution of carbon disulfide in hydrogen fluoride.

Reaction chamber or reactor 10 (Fig. 1) represents a four inch diameter copper tubing flattened to provide a chamber of about three-quarters of an inch in height, inside measurement, the same being about nine feet in length. This chamber 10 is connected by a copper tubing 11 to a purifying chamber 12. This purifying chamber 12 is used for the removal of the hydrogen fluoride from the product, and is made of a three inch copper tubing, two feet long. This purifying vessel in turn is connected by a copper tubing 13 to cold traps 14 and 15, said traps being interconnected by tube 16. Trap 14 is preferably inserted in Dry Ice, whereas trap 15 is preferably inserted in liquid oxygen. Trap 15 has exhaust tube 17 open to the air.

The reactor 10 is also connected at one end by means of copper tubing 18 to valve 19 which has inlet tube 20. Also, copper tube 18 may be connected by copper tube 21 to valve 22 which in turn may be connected by tube 23 to evaporator 24 which may be either glass or copper. Evaporator 24 is connected by tube 25 to a gas drying chamber 26 which may be about one foot long and of one inch diameter. This chamber 26 is connected by copper tubing 27 to valve 28 which in turn is connected to a flow meter 29 which in turn is connected to valve 30 to which is connected a supply nitrogen cylinder 31.

Inside of reactor 10 is preferably located a temperature indicating means which may comprise a thermocouple well consisting of a copper tube 32. This thermocouple may be slidably disposed in said well 32 so as to take the temperature at varying points of the reactor 10. Around reactor 10 is preferably disposed a layer of asbestos 34 around which is wound a Nichrome wire 35, and then around this wire is insulation 36. Thus is provided a heating means for the reactor 10.

In order to provide different temperatures in different sections of the reactor 10 (Fig. 2), the heating element is divided into five sections 37, 38, 39, 40 and 41, each having its lead-out wires 42. Each section has its own electrical current control means so that different degrees of heat can be provided for the different sections of the tube.

In carrying out the fluorination, 36 moles of cobalt trifluoride are supplied to the reactor 10. This is inserted at the time of construction of the tube.

The purpose of the flattened character of the reactor chamber is to permit the cobalt trifluoride to be spread into a broad and shallow bed thereby permitting extensive contact between the salt and the gas passing through the system. This cobalt trifluoride is maintained at a temperature of $250 \pm 10°$ C. The temperatures considerably below or above may be successfully used. However, we find very satisfactory results obtainable at 250° C.

The purifying chamber 12 is provided with an ample supply of sodium fluoride. In our experimental work we found that having it half-filled gave an ample excess for purifying purposes. Drying vessel 26 is packed with a drying agent such as anhydrous magnesium perchlorate.

Trap 15 is connected by glass tube 45 with valve 46 to low temperature filter 47 having a porous glass filter plate 48 in the bottom portion thereof. The bottom of filter 47 is connected by capillary tubing 49, of any standard design. Capillary tubing 49 is connected by tubing 50 to valve 51. Valve 51 is connected by tubing 52 to a vacuum producing means of any standard design. Connecting tube 50 of glass connects with glass tubing 53 having valves 54, 55 and 56. After valve 54 tube 53 is connected by tube 57 to a fractionating column 58 suitable for the separation of substances boiling below 25° C. Filter 47 is enclosable in a bath 47a, which may contain a liquid to provide the desired low temperature. After valve 55 a connecting tube 59 with valve 60 is connected to bulb 61 having mercury 62 therein. Vessel 61 is connected to levelling bulb 63 through a glass tube 64 having valve 65 therein. Glass tube 64 is connected to levelling bulb 63 by means of a rubber tube 66. Bulb 61 has outlet tube 67 which has valve 68 therein. The outlet tube 67 may open into a vessel 69 for collecting mercury.

Tube 53 has a lead-off tube 70 which connects with tube 71 which has branches 72, 73 and 74 with valves respectively 75, 76 and 77 leading into gas receiver flasks 78, 79 and 80.

*Method 1.*—We will now proceed to describe the first method of producing trifluoromethylsulfur pentafluoride by action of cobalt trifluoride on methyl mercaptan.

With the apparatus as described above, valve 30 is opened to allow nitrogen to flow from cylinder 31 through flow meter 29 so that the flow is at the rate of about three liters per hour. Such rate of flow may be more or less. This nitrogen is dried in vessel 26 and then bubbled through methyl mercaptan held in evaporator 24 at a temperature of 0° C. From there the mixture of nitrogen and methyl mercaptan vapor is conducted to reactor 10. The stream of gas passes through said reactor 10 and thence through purifier 12 where hydrogen fluoride is removed and subsequently through trap 14 in which a temperature of —78.5° C. is provided, and then through trap 15 having a temperature of —183° C. where substances other than nitrogen are condensed to form liquids and solids (the nitrogen escaping through exhaust pipe 17). Throughout the specification, the proper setting of valves will be understood even though the same are not expressly mentioned as this is obvious. (This operation, i. e., passing of the mixture of methyl mercaptan vapor and a diluent such as nitrogen, may be continued until substantially one-half of the cobalt trifluoride has been reduced to cobalt difluoride.)

After the methyl mercaptan is introduced, dry nitrogen is allowed to flow through the system for a sufficient period (for example, for a period of five hours if the rate of flow of the nitrogen is about three liters per hour) to sweep reaction products from vessels 10 and 12 into the traps 14 and 15 where they are condensed.

Only a part of the material collected in traps 14 and 15 is trifluoromethylsulfur pentafluoride. In order to obtain the latter material in a pure state, refining operations are successively used, these involve low temperature filtration and fractional distillation.

In performing the low temperature filtration, the substances collected in traps 14 and 15 are transferred through tube 45 and valve 46 into the upper portion of low temperature filter 47 at which time it is surrounded by liquid oxygen held in bath 47a. This provides a temperature of —183° C. and condenses the gases into liquid form and solids. After all of the material has been so transferred, the resulting liquid is withdrawn through the porous glass filter plate 48 and glass capillary 49 and connecting tubing 52 and valve 51 by means of a suitable vacuum producing means of standard construction which forms no part of this invention, and, therefore, is not described. Of course, it will be understood that valve 54 is closed during the operation of the vacuum connected to tube 52. The material removed at this time is nearly all carbon tetrafluoride. The solid material remains in filter 47. Bath 47a of liquid oxygen is replaced by an identical bath of half-frozen ether giving a temperature of approximately —120° C. Again, vacuum filtration is used and an additional small quantity of liquid is removed from the filter by vacuum through tube 52 as previously described hereinabove. Parenthetically, let it be noted that the capillary tube 49 facilitates the removal of the liquid from the filter 47 by preventing the gas from bubbling through the liquid.

The bath 47a surrounding the filter is then replaced by another containing a mixture of Dry Ice and acetone which provides a temperature of —78.5° C. Valve 51 is closed and valves 53, 54, 55 and 56 are opened. Trap 53b is surrounded by liquid oxygen. Suitable vacuum producing means is applied to tube 53c. This causes the transfer of material or substances existing as liquid in filter 47 to trap 53b where it is again condensed (it being understood that the substances after leaving the filter 47 become gas in tubes 50 and 53). The solid remaining in filter 47 is mostly sulfur hexafluoride. This is later collected as a by-product.

The substances solidified in trap 53b are now transferred by distillation through tubes 53c and 57 and valve 54 into the distilling bulb 58a of the fractionating column 58 by vacuum distillation. The components held in the bulb 58a are then separated from each other by fractional distillation. In this operation, gases are removed slowly from the top of the column through tube 57 (valves 54 and 56 being closed) and tube 59 (valves 55 and 60 being open) and are collected in bulb 61. The rate of collection of this gas is controlled by regulating the flow of mercury through valve 68 and tube 67 into a reservoir 69. Later the gas in 61 is transferred into one of the bulbs 78, 79 or 80 by closing valves 68, 55, and opening valve 65 and one of the valves on the receiving bulbs, such as 75. Valves 65 and 75 are then closed and valves 55 and 68 are opened and an additional quantity of gas is collected in bulb 61. Uusing collecting bulb 61 and receiving flasks 78, 79 and 80, numerous cuts are taken during the distillation of the material in bulb 58a.

Progress of the distillation is followed by means of thermocouple 58b which registers the temperature of the vapor in the column a short distance below the distillating head. The highest boiling substance found in the product boils under atmospheric pressure at —20.4° C. This is collected and is substantially pure trifluoromethylsulfur pentafluoride. Purity of this substance is indicated by the following:

(1) Constant distillation temperature;
(2) Constant vapor density (molecular weight equals 197±1);
(3) Substantially constant freezing point for different cuts during distillation; and
(4) Substantially constant analysis.

The properties of the product or compound of our invention and discovery are as follows: boiling point —20.4° C. at one atmosphere pressure; molecular weight from vapor density measurements is 197±1; freezing point —86.9±.2° C.; transition point —153.3±.3° C. The composition of said compound as experimentally determined is: fluorine 77.3%; sulfur 16.1%. A qualitative test for carbon was obtained.

The compound, trifluoromethylsulfur pentafluoride, $CSF_8$, should theoretically contain 16.3% sulfur and 77.5% fluorine. Its molecular weight should be 196.07. A structural determination of the product trifluoromethylsulfur pentafluoride was not made but we believe its formula might well be written $CF_3SF_5$.

This compound, trifluoromethylsulfur pentafluoride, is a colorless substance which is substantially odorless, and very highly inert. This latter characteristic is illustrated by its failure to react with a solution of six molar sodium hydroxide. Many similar fluorides do react rapidly with said sodium hydroxide. It is substantially without action upon metallic sodium at room temperature, but when the metal is heated to a dull redness, it reacts vigorously with a liberation of light. Trifluoromethylsulfur pentafluoride is an excellent gaseous electrical insulator. Sulfur hexafluoride, as is well known, is recognized as a very excellent electrical insulating gas. However, the product of our invention is superior as an electrical insulating gas to sulfur hexafluoride.

When the method set forth above is used under the conditions indicated, a yield of about .82 gram of trifluoromethylsulfur pentafluoride is obtained per gram of methyl mercaptan employed. Twenty-two grams of methyl mercaptan were used in a run which yielded eighteen grams of trifluoromethylsulfur pentafluoride when the temperature of the reactor was maintained at 250±10° C. Our work indicated that a lower yield resulted when lower temperatures, such as 200° C. and 100° C. were employed.

That part of the system in advance of traps 14 and 15 is disconnected, and reconditioned for further operation as follows:

Nitrogen is passed directly from vessel 26 through valve 26a and connecting tube 26b, and is passed along through vessel 12 and outlet tube 13, while vessel 12 is in the meantime held at a temperature of about 250° C. This is continued until substantially all of the hydrogen fluoride set free from the salt in vessel 12 is removed.

Next, the mixture formed of fluorine, introduced through tubes 20 and valve 19, and nitrogen, flowing through valve 22 and tube 21, is passed through reactor 10. The proportion of nitrogen and fluorine is about three of nitrogen to one of fluorine. The reaction vessel is held during this operation at about 200° C. and the process is continued until the gas leaving the vessel through valve 10a and exhaust tube 10b contains unreacted fluorine.

These operations restore the sodium fluoride in vessel 12 and the cobalt fluoride in the vessel 10 to their original condition.

*Method 2.*—The second method of providing the product trifluoromethylsulfur pentafluoride comprises the action of cobalt trifluoride upon carbon disulfide. The fluorination under this second method follows substantially the steps as set forth in method No. 1 except that the carbon disulfide held in evaporator 24 may be at a temperature higher than 0° C.—for example, at the preferred temperature, 25° C. The temperature in reactor 10 is preferably maintained at 200° C. to 250° C. Following this method about 82 grams of trifluoromethylsulfur pentafluoride may be produced from a 75 gram batch of carbon disulfide.

*Method 3.*—In the apparatus, Fig. 4, employed for the catalytic preparation of trifluoromethylsulfur pentafluoride, glass tube 100 serves as a connector means to a suitable source of nitrogen, as a nitrogen cylinder (not shown). Tube 100 is connected to tube 101, which tube has valves 102 and 103. Flow meters 104 and 105 are connected to tube 101, one on each side of valves 102 and 103 respectively. Glass tube 101 is connected to copper tube 106 at 107. This copper tube 106 is connected with tube 108 which is connected with the reactor 109. Tube 108 also is connected with cylinder 110 through tube 111 which communicates with flow meter 112 and has valve 113. In the reactor 109 is the catalyst 114. The reaction vessel 109 consists of a copper tube 7.5 cm. inside diameter and a length of 90 cm. It is packed tightly with a catalyst made from 4500 g. of copper ribbon of 0.035 cm. width and 0.008 cm. thickness, having a total surface area of 150,000 square cms. In the preparation of the catalyst 100 g. of silver was deposited on the surface of the ribbon by displacement from a solution containing dicyanoargentate ion. Fluorine gas was later used to convert the silver to the difluoride. The reaction vessel is built in such a way that its temperature can be controlled by regulating the flow of electricity through two separate sections of Nichrome ribbon 115 and 116 used for electrical heating—see Fig. 4. When the system is in operation, a temperature, preferably within the range 190° C. to 210° C. is maintained. Reactor 109 has thermocouple wells 117 and 118 in which thermocouples are provided to indicate the temperature. The bottom of reactor 109 is connected by tube 119 to the purifying vessel 120. Vessel 120 is connected by conduit 121 having valve 122 to trap 123. Trap 123 corresponds to trap 14 of the apparatus shown in Fig. 1. In this instance, the temperature is held at −183° C. The extra trap 15 is not employed. From here on the apparatus is the same as that shown in Fig. 1, and operates in similar manner as disclosed in setting forth method No. 1.

Dried nitrogen is introduced from a nitrogen cylinder through glass tube 100 to tube 101 (valves 102 and 103 being opened to such a degree that the flow is divided to permit gas preferably to pass through each at about three liters per hour). The nitrogen passing through valve 103 and flow meter 105 and tube 130a bubbles through methyl mercaptan held in evaporator 105a, the latter being held at a temperature of about 0° C. The mixture of nitrogen and methyl mercaptan vapor enters the catalytic vessel through valve 105b. Nitrogen flowing through valve 102 and flow meter 104 is mixed with fluorine entering through tube 111 and the mixture enters the catalyst chamber 109 through tube 108. Throughout the operation the rate of flow of fluorine is so controlled that a slight excess over that required for reaction with methyl mercaptan is always present. This excess can be detected by the darkening of potassium iodide paper held at the exhaust tube 124. The gaseous material passes from the catalytic chamber 109 through tube 119 and purifier 120 where hydrogen fluoride is absorbed by sodium fluoride. The gas stream then passes through tube 121 and valve 122 and trap 123. The latter is held at −183° C. by being immersed in a bath of liquid oxygen. In this trap reaction products are collected. These are subsequently subjected to the same refining process as that described in procedure No. 1. The weight of trifluoromethylsulfur pentafluoride obtained under the preferred conditions of operation is about 0.42 gram per gram of methyl mercaptan consumed. An additional compound of the formula $CSHF_7$ is also obtained, the amount being about .56 gram per gram of methyl mercaptan reacted. This substance boils at 5.1° C. It is much more reactive than trifluoromethylsulfur pentafluoride and will, for example, hydrolyze rapidly in a solution of sodium hydroxide, all of the fluorine atoms being converted to fluoride ions in the solution. It may be readily converted into $CSF_8$, trifluoromethylsulfur pentafluoride, by further fluorination using either the catalytic method described as method No. 3 or the cobalt trifluoride process described as method No. 1.

*Method No. 4 (electrolytic process).*—The apparatus, Fig. 5, in general for effecting the electrolytic production of trifluoromethylsulfur pentafluoride consists of three parts:

(1) An electrolytic cell;
(2) A reflux condenser for returning hydrogen fluoride to the cell; and
(3) A trap used to condense reaction products.

The cell body 200 comprises a fifteen inch length of four inch iron pipe closed at the bottom by a welded on iron disc 201 to which is attached clean-out pipe 202 with valve 203. The cell is covered by a bolted-on lid 204 to which is secured the following: a nickel cathode 205 comprising a one-inch rod of twelve-inch length; a cylindrical nickel anode 206 having a length of eleven and one-half inches and made from sheet nickel one-sixteenth of an inch thick; a cylindrical copper skirt 210 fastened to the lid by silver solder in such a location that it prevents mixing of gases of the anode and cathode compartments; a gas outlet tube 211 from the anode chamber; and a gas outlet tube 212 from the cathode chamber. The outlet tubes are made from one-quarter of an inch copper tubing. The skirt has a length of five inches and a diameter across the cylinder of two and one-half inches. The electrodes are attached to copper rods 207, 208 and 209 which are electrically insulated from the lid 204. The whole cell is immersed in a bath comprising a mixture of ice and water to a point about two inches below the lid 204.

The reflux condenser comprises an ascending spiral of one-quarter inch copper tubing 213 surrounded by an iron vessel 214. Tube 213 leads to the trap 215 surrounded by a Dewar vessel 216 which is supplied with liquid oxygen. At the outlet tube 217 is placed a drying tube 218 containing magnesium perchlorate.

Hydrogen fluoride vapor is introduced through tube 211 and is condensed in the cell 200, such an amount being collected that it fills the cell to a depth within two and one-half inches of the lid 204. Next, carbon disulfide in an amount such as, for example, 150 grams may be added to the cell 200 through tube 211 and subsequently water in the amount of 2 grams, for example, is introduced. The purpose of the latter is to make the liquid in the cell 200 a good conductor of electricity. During the subsequent operation of the cell, small quantities of water are added from time to time in order to maintain the relatively high electrical conductance. It is also necessary to add some hydrogen fluoride to maintain the liquid level at approximately the same location. Suitable sources of electrical energy are connected to rods 208 and 209 and a direct current of about five amperes is caused to pass. This requires a potential ranging between five and seven volts. During the electrolysis, no gas is set free in the anode chamber. All of the gaseous product emerges from the cathode chamber and passes from the cell through tube 212. Reflux condenser 213, which is surrounded by a bath of Dry Ice in acetone, serves to condense hydrogen fluoride from the gas and to return it as a liquid to the cell through tube 212. That portion of the gas entering trap 215 therefore contains little hydrogen fluoride. The product collected in trap 215 is handled in a refining procedure the same as that used for the material collected in trap 15 as set forth herein above in method No. 1. The rate of production of trifluoromethylsulfur pentafluoride by this procedure averages about 2.5 grams per faraday of electricity passed through the cell.

The principal by-products of this process are carbon tetrafluoride and sulfur hexafluoride.

It will be understood that the above constitute preferred methods of forming the product trifluoromethylsulfur pentafluoride. Among the numerous variations of the procedures which may be made are the following:

(1) Any suitable means may be employed for mixing the diluent gas with the vapor of methyl mercaptan or carbon disulfide;

(2) Different inert diluents, for example, argon or carbon tetrafluoride, may be used in place of nitrogen;

(3) The proportions of reacting substances and diluents may be varied within wide limits;

(4) The temperatures of the reaction vessels 10 and 109 may vary within wide limits. Temperatures between 100° C. and 300° C. are satisfactory but those given above are preferred; and (5) Numerous procedures for the separation of the reaction products may be used.

The electrolytic cell 200 may be maintained at any temperature between the freezing point and boiling point of the electrolyte. At this point it should be noted that one of the difficulties encountered is the separation of the reaction products which contain not only the corrosive substance hydrogen fluoride but also the subliming solid sulfur hexafluoride. This latter compound if present at the time of fractional distillation is apt to plug the fractionating column.

A somewhat larger proportion of water than that used in method No. 4 may be employed. This has the advantage of increasing the conductivity of the electrolyte. Also, suitable fluoride salts could be used for this purpose. Some difficulty from corrosion in the case of fluoride salts may be expected.

In addition to the low temperature filtration and fractional distillation method cited above, the products resulting from the process could be separated advantageously by distillation under pressure.

As stated above, trifluoromethylsulfur pentafluoride is useful as a starting material in the production of sulfur tetrafluoride. In such production, electric sparks are passed through trifluoromethylsulfur pentafluoride in the form of a gas which results in forming sulfur tetrafluoride and carbon tetrafluoride.

We claim:

1. The compound trifluoromethylsulfur pentafluoride.

2. The compound trifluoromethylsulfur pentafluoride having the empirical formula $CSF_8$ and substantially the following properties: a boiling point under atmospheric pressure of $-20.4°$ C., a molecular weight of 196.07, a melting point of $-86.9 \pm 0.2°$ C., and a transition point of $-153.3 \pm 0.3°$ C.

3. The compound trifluoromethylsulfur pentafluoride having the empirical formula $CSF_8$ and substantially the following properties: a boiling point under atmospheric pressure of $-20.4°$ C., a molecular weight of 196.07, a melting point of $-86.9 \pm 0.2°$ C., a transition point of $-153.3 \pm 0.3°$ C., and highly inert, reacting with metallic sodium only when the metal is heated, the compound being a colorless gas.

4. The method of producing trifluoromethylsulfur pentafluoride comprising maintaining cobalt trifluoride between 100° C. and 300° C.; causing reaction to take place between methyl mercaptan vapor diluted with nitrogen and said cobalt trifluoride; and removing trifluoromethylsulfur pentafluoride from the gaseous reaction products.

5. The method of producing trifluoromethylsulfur pentafluoride comprising maintaining cobalt trifluoride at about 250° C.; causing reaction to take place between methyl mercaptan vapor diluted with nitrogen and said cobalt trifluoride; removing from the gaseous products the hydrogen fluoride; and separating out trifluoromethylsulfur pentafluoride by low temperature filtration and fractional distillation.

6. The method of producing trifluoromethylsulfur pentafluoride comprising maintaining cobalt trifluoride at about 250° C.; passing methyl mercaptan vapor diluted with nitrogen over said cobalt trifluoride; treating the reaction gaseous products with sodium fluoride, whereby hydrogen fluoride is removed; condensing the said gaseous products; and separating out the trifluoromethylsulfur pentafluoride by low temperature filtration and fractional distillation.

7. The method of producing trifluoromethylsulfur pentafluoride comprising maintaining cobalt trifluoride between 100° C. and 300° C.; causing reaction to take place between carbon disulfide vapor diluted with nitrogen and said cobalt trifluoride; and removing trifluoromethylsulfur pentafluoride from the gaseous reaction products.

8. The method of producing trifluoromethylsulfur pentafluoride comprising maintaining cobalt trifluoride at about 200° C.; causing reaction to take place between carbon disulfide vapor diluted with nitrogen and said cobalt trifluoride; removing from the gaseous products the hydrogen fluoride; and separating out trifluoromethylsulfur pentafluoride by low temperature filtration and fractional distillation.

9. The method of producing trifluoromethylsulfur pentafluoride comprising maintaining cobalt trifluoride at about 200° C.; passing carbon disulfide vapor diluted with nitrogen over said cobalt trifluoride; treating the reaction gaseous products with sodium fluoride, whereby hydrogen fluoride is removed; condensing the said gaseous products; and separating out the trifluoromethylsulfur pentafluoride by low temperature filtration and fractional distillation.

10. The method of producing trifluoromethylsulfur pentafluoride comprising causing reaction to take place between cobalt trifluoride and a member selected from the group consisting of methyl mercaptan and carbon disulfide.

11. The method of producing trifluoromethylsulfur pentafluoride comprising maintaining cobalt trifluoride between 100° C. and 300° C.; and causing reaction to take place between said cobalt trifluoride and a member selected from the group consisting of methyl mercaptan and carbon disulfide.

12. The method of producing trifluoromethylsulfur pentafluoride comprising maintaining cobalt trifluoride between 100° C. and 300° C.; and causing reaction to take place between said cobalt trifluoride and a vapor of a member selected from the group consisting of methyl mercaptan and carbon disulfide.

13. The method of producing trifluoromethylsulfur pentafluoride comprising maintaining cobalt trifluoride between 100° C. and 300° C.; and causing reaction to take place between said cobalt trifluoride and a nitrogen diluted vapor of a member selected from the group consisting of methyl mercaptan and carbon disulfide.

References Cited in the file of this patent

UNITED STATES PATENTS

| Number | Name | Date |
| --- | --- | --- |
| 2,317,866 | Tamele | Apr. 27, 1943 |
| 2,555,739 | Gall | June 5, 1951 |
| 2,575,290 | Ohsol et al. | Nov. 13, 1951 |

OTHER REFERENCES

Geballo et al.: J. Applied Physics, vol. 21, pp. 592–4 (June 1950).

Silvey et al.: J. Am. Chem. Soc., vol. 72, pp. 3624–6 (August 1950).